May 7, 1929.  W. HEALD  1,711,496
DEVICE FOR FEEDING FUEL MIXTURES TO INTERNAL COMBUSTION ENGINES
Filed June 7, 1928
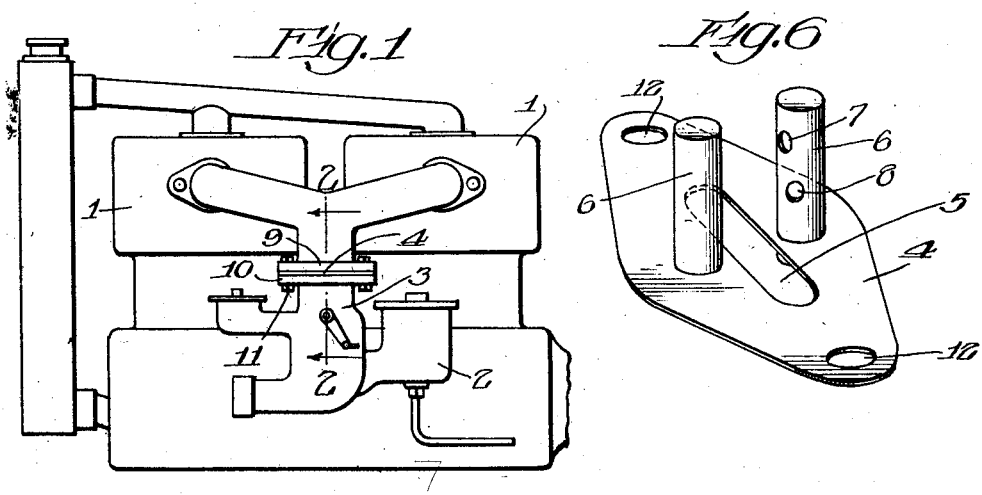
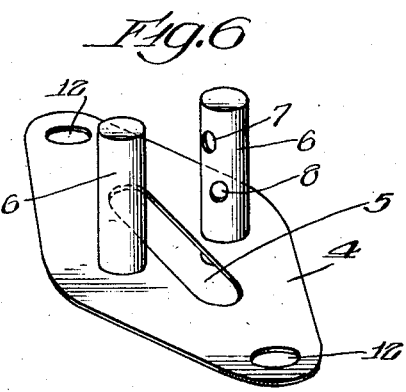
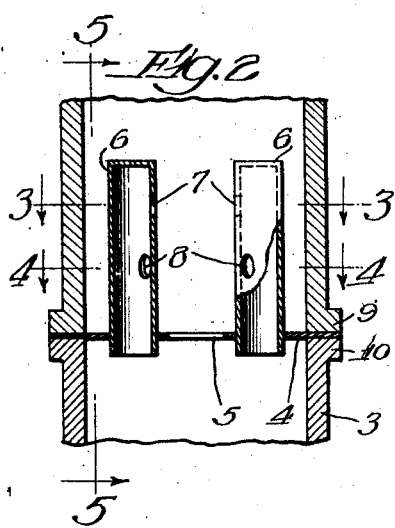
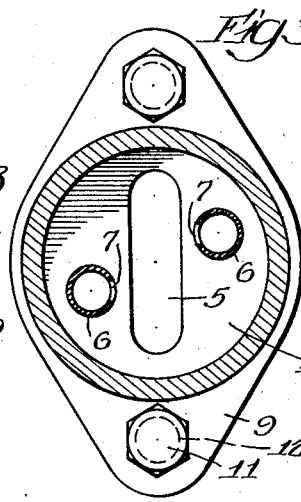
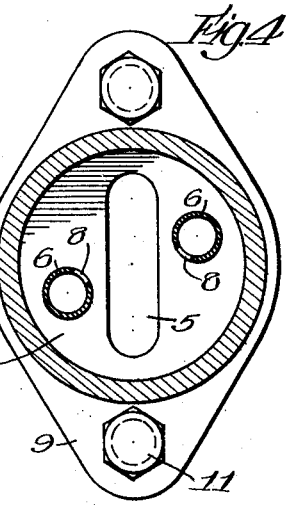
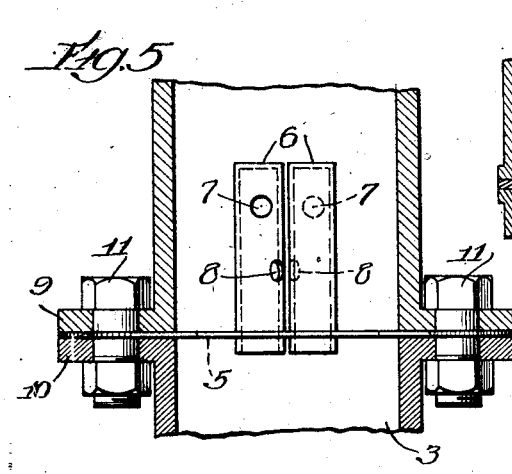
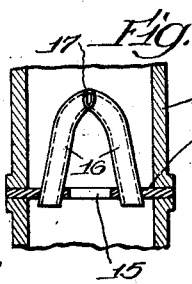
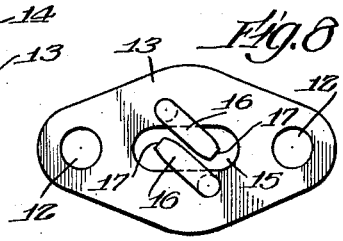
Inventor:
William Heald
By Parker Carter attys.

Patented May 7, 1929.

1,711,496

UNITED STATES PATENT OFFICE.

WILLIAM HEALD, OF LA PORTE, INDIANA, ASSIGNOR OF ONE-FOURTH TO DONALD M. CARTER, OF CHICAGO, ILLINOIS.

DEVICE FOR FEEDING FUEL MIXTURES TO INTERNAL-COMBUSTION ENGINES.

Application filed June 7, 1928. Serial No. 283,569.

This invention relates to devices for feeding fuel mixtures to internal combustion engines and has for its object to provide a new and improved device of this description.

The invention has as a further object to provide a device of the kind described which can be easily and quickly applied to any internal combustion engine.

The invention has as a further object to provide a device for feeding fuel mixtures to internal combustion engines which increases the efficiency of the engine and reduces the amount of fuel consumed.

The invention has as a further object to provide a device for feeding fuel mixtures to internal combustion engines which causes such engine to operate with greater ease and efficiency under heavy loads.

The invention has further objects which are more particularly pointed out in the accompanying description.

Referring now to the drawings, Fig. 1 is a view of an internal combustion engine embodying one form of the invention.

Fig. 2 is an enlarged sectional view on line 2—2 of Fig. 1.

Fig. 3 is a sectional view taken on line 3—3 of Fig. 2.

Fig. 4 is a sectional view taken on line 4—4 of Fig. 2.

Fig. 5 is a sectional view taken on line 5—5 of Fig. 2.

Fig. 6 is a perspective view of one form of device which is inserted in the intake pipe of the engine.

Fig. 7 is a sectional view through the intake pipe showing a modified construction.

Fig. 8 is an enlarged plan view of the device shown as inserted in the pipe of Fig. 7.

Like numerals refer to like parts throughout the several figures.

Referring now to the drawings, I have shown an internal combustion engine having cylinders 1. A carburetor 2 of any desired construction is connected with the intake pipe 3 of the engine. Inserted at any convenient point in the intake pipe between the carburetor and the engine cylinders is a device for acting upon the stream of the fuel mixture consisting of a plate 4 having an opening 5 therethrough. Connected with the plate 4 are one or more fuel directing members 6 which are hollow and into which fuel from the carburetor passes. These fuel directing members are open at one end so that the fuel mixture is admitted therein. Each fuel directing member is provided with an outlet which is preferably smaller in cross sectional area than the inlet. The outlet of each fuel directing member is arranged so that the stream of material discharged therefrom strikes the stream of material passing through the opening 5 at an angle.

In the construction shown in Figs. 1 to 6, the fuel directing members 6 are each provided with a plurality of discharge openings 7 and 8 arranged to direct the stream of material at an angle to the stream of material passing through the remaining portion of the inlet pipe.

The two fluid directing members 6 are arranged so that the stream of material discharged from the openings 7 and 8 do not meet but these streams of material do flow across the streams passing through the opening 5. By making the cross sectional area of the discharge openings 7 and 8 smaller than the intake opening, a nozzle action is secured.

The plate 4 preferably partially obstructs the intake pipe and the opening 5 is smaller in cross sectional area than the passageway extending through the intake pipe. When the discharge openings are at the sides of the fuel directing members, one end of each of said members is preferably closed, as shown in Figs. 2 and 6. The plate 4 may be inserted in the intake pipe in any manner desired and for purposes of illustration, I have shown it as inserted between the flanges 9 and 10. The plate is held in position by the bolts 11 which fasten the flanges together being preferably provided with openings 12 for such bolts.

The fuel directing members are preferably offset or staggered, as shown in the drawing so that the streams of fuel mixture discharged therefrom will not interfere with each other. In Figs. 7 and 8, I have shown a modified construction wherein the plate 13, which is inserted in the pipe 14 is provided with the opening 15 and has connected therewith the two fuel directing members 16. These fuel directing members are open at both ends. The openings in the discharge ends 17 are smaller than the inlet openings so as to secure a nozzle effect and these discharge ends are bent at an angle to the body portion so as to direct the stream of fuel mixture across the stream of fuel mixture passing through the inlet pipe 14.

I have found that with a construction of the kind herein described, I am able to reduce very greatly the amount of fuel used to secure a given result than is possible with the same engine when this device is not used.

I am also able to secure greater power on hills than is possible without the use of this device. I have also found that with this device the engine runs easier and with less noise and knocking of the engine is reduced or eliminated.

It will further be seen that this device can be easily applied to any internal combustion engine and especially to internal combustion engines such as are used in connection with automobiles. To apply the device, it is only necessary to disconnect the intake pipe at some point and insert this device at such point. It will further be seen that the cost of the device is small and that it can be inserted by the user as well as the manufacturer.

It will be noted that in this device the connection between the carburetor and the engine cylinders is reduced at some point therealong and there is a fuel mixture directing member in said connection which directs a stream of fluid mixture into the stream of fuel mixture passing through the restricted portion of said connection and at an angle thereto.

I have described a particular construction for purposes of illustration, showing one form of my invention but it is of course evident that the parts and the arrangement may be varied in many particulars without departing from the spirit of the invention as embodied in the claims hereto appended.

I claim:—

1. A device for feeding fuel mixtures to internal combustion engines comprising a plate adapted to be inserted in the inlet pipe, said plate being provided with an enlarged unobstructed centrally located opening, an elongated fuel directing member connected with said plate and having an inlet opening at the lower end to permit fuel mixture to pass therein, said fuel directing member having an outlet opening adjacent the said centrally located opening, and adapted to direct a stream of fuel mixture crosswise of the centrally located opening in said plate.

2. A device for feeding fuel mixtures to internal combustion engines comprising a plate adapted to be inserted in the intake pipe of the engine, said plate being provided with a main opening through which the fuel mixture passes, a second opening in said plate at the side of said main enlarged unobstructed centrally located opening, a hollow pipe closed at the upper end and connected with said plate at the point where said second opening is located, the lower end thereof being open to permit the fuel mixture to pass therein, said hollow pipe having a discharge opening at an angle to the vertical plane of the main centrally located opening in said plate and adapted to direct a stream of fuel mixture in an angular direction across said centrally located opening.

3. A device for feeding fuel mixtures to internal combustion engines comprising a plate adapted to be inserted in the intake pipe of the engine, said plate being provided with a main enlarged unobstructed centrally located opening through which the fuel mixture passes, a second opening in said plate at the side of said main opening and smaller in cross sectional area than the central opening, a hollow pipe connected with said plate at the point where said second opening is located, the lower end thereof being provided with an inlet opening to permit the fuel mixture to pass therein, said hollow pipe having a discharge opening at an angle to the vertical plane of the main centrally located opening in said plate, said discharge opening being smaller in cross sectional area than the inlet opening of said pipe and adapted to direct a stream of fuel mixture in an angular direction across said centrally located opening.

4. A device for feeding fuel mixtures to internal combustion engines comprising a plate adapted to be inserted in the intake pipe of the engine, said plate being provided with a main enlarged unobstructed centrally located opening, two additional openings in said plate one on each side of said main opening, hollow pipes connected with said plate at the points where said additional openings are located the lower ends thereof being open to permit the fuel mixture to pass therein, said hollow pipes having discharge openings on the sides thereof nearest said main opening in said plate the lower open ends of said hollow pipes projecting below said plate.

5. A device for feeding fuel mixtures to internal combustion engines, comprising a plate adapted to be inserted in the intake pipe of the engine, said plate being provided with a main enlarged unobstructed centrally located opening, two additional openings in said plate, one on each side of said main opening, hollow pipes connected with said plate at the points where said additional openings are located, the lower ends thereof being open to permit the fuel mixture to pass therein, said pipes having discharge openings adjacent the said main centrally located opening and adapted to direct a stream of fuel mixture crosswise thereof, said pipes being offset with relation to each other.

Signed at Chicago county of Cook and State of Illinois, this 31st day of May, 1928.

WILLIAM HEALD.